US009302947B2

(12) United States Patent
Tomosue et al.

(10) Patent No.: US 9,302,947 B2
(45) Date of Patent: Apr. 5, 2016

(54) INORGANIC FIBER AND PROCESS FOR MANUFACTURING SAME

(71) Applicant: NICHIAS CORPORATION, Tokyo (JP)

(72) Inventors: Nobuya Tomosue, Tokyo (JP); Kazutoshi Isomura, Tokyo (JP); Kazutaka Murayama, Tokyo (JP); Kiyoshi Sato, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 14/374,135

(22) PCT Filed: Jan. 21, 2013

(86) PCT No.: PCT/JP2013/000251
§ 371 (c)(1),
(2) Date: Jul. 23, 2014

(87) PCT Pub. No.: WO2013/114808
PCT Pub. Date: Aug. 8, 2013

(65) Prior Publication Data
US 2015/0038320 A1 Feb. 5, 2015

(30) Foreign Application Priority Data

Jan. 31, 2012 (JP) .................. 2012-018519
Jan. 31, 2012 (JP) .................. 2012-018520

(51) Int. Cl.
*D02G 3/00* (2006.01)
*C04B 35/622* (2006.01)
(Continued)

(52) U.S. Cl.
CPC ......... *C04B 35/62236* (2013.01); *C04B 35/624* (2013.01); *C04B 35/62245* (2013.01);
(Continued)

(58) Field of Classification Search
CPC .............. D01F 9/08; D01F 9/10; B32B 5/02; B32B 5/022; B32B 15/02
USPC ................... 428/113, 357, 364, 902; 442/401
See application file for complete search history.

(56) References Cited

U.S. PATENT DOCUMENTS

| 8,163,377 B2 * | 4/2012 | Wainwright et al. ...... 428/296.7 |
| 2009/0130937 A1 | 5/2009 | Wainwright et al. |
| 2013/0331254 A1 † | 12/2013 | Murayama |

FOREIGN PATENT DOCUMENTS

| CN | 1236832 A | 12/1999 |
| EP | 2 679 710 A1 | 1/2014 |

(Continued)

OTHER PUBLICATIONS

English Translation of the International Preliminary Report on Patentability, mailed on Aug. 14, 2014.
(Continued)

*Primary Examiner* — Noah Wiese
(74) *Attorney, Agent, or Firm* — Griffin and Szipl PC

(57) ABSTRACT

Provided is a method for producing inorganic fiber including: preparing a spinning raw material liquid which comprises an aluminum source, a calcium source, a silicon source and a spinning auxiliary, in which the content of the spinning auxiliary is, in terms of solid matter, 3 parts by mass or more relative to 100 parts by mass of the total of the aluminum source, the calcium source and the silicon source; spinning the spinning raw material liquid by a sol-gel method to obtain crude inorganic fiber; and firing the crude inorganic fiber to produce inorganic fiber that comprises 35 mass % to 88 mass % of $Al_2O_3$, 3 mass % to 45 mass % of CaO and 5 mass % to 40 mass % of $SiO_2$ in which the total of $Al_2O_3$, CaO and $SiO_2$ is 97 mass % or more of the entire fiber.

5 Claims, 1 Drawing Sheet

(51) Int. Cl.
*D01F 9/08* (2006.01)
*C04B 35/64* (2006.01)
*C04B 35/624* (2006.01)
*D01F 1/08* (2006.01)

(52) U.S. Cl.
CPC . *C04B35/64* (2013.01); *D01F 1/08* (2013.01); *D01F 9/08* (2013.01); *C04B 2235/3208* (2013.01); *C04B 2235/3217* (2013.01); *C04B 2235/3418* (2013.01); *C04B 2235/443* (2013.01); *C04B 2235/444* (2013.01); *C04B 2235/5264* (2013.01); *C04B 2235/5454* (2013.01)

(56) References Cited

FOREIGN PATENT DOCUMENTS

| JP | 2005344257 A | 12/2005 | | |
| JP | 2006016739 A | 1/2006 | | |
| JP | 2009515800 A | 4/2009 | | |
| JP | 2011-196008 A | * 10/2011 | ................ | D01F 9/08 |
| JP | 2011196008 A | 10/2011 | | |

OTHER PUBLICATIONS

International Search Report in corresponding International Application PCT/JP2013/000251, completed on Apr. 15, 2013, and mailed on Apr. 23, 2013.

Office Action issued in corresponding Chinese application 20138007453.0 on May 26, 2015.

Supplementary European Search Report issued in corresponding application 13743959.2, completed Sep. 29, 2015 and mailed Oct. 6, 2015.

* cited by examiner
† cited by third party

INORGANIC FIBER AND PROCESS FOR MANUFACTURING SAME This is a National Phase Application in the United States of International Patent Application No. PCT/JP2013/000251 filed Jan. 21, 2013, which claims priority on Japanese Patent Application Nos. 2012-018519 and 2012-018520, both filed Jan. 31, 2012. The entire disclosures of the above patent applications are hereby incorporated by reference.

TECHNICAL FIELD

The invention relates to inorganic fiber and the method for producing the same.

Inorganic fiber is composed mainly of a fibrous substance formed of an inorganic compound. Due to its excellent heat resistance, inorganic fiber is used as a constituent material such as a heat-insulating material, a refractory material or the like in various fields including automobiles, buildings, industrial furnaces or the like.

As for inorganic fibers having a small fiber diameter, asbestos has conventionally been known. Asbestos has a small fiber diameter, and has a high chemical resistance to body fluids, and hence, it is believed that asbestos reaches deep inside the lung, stimulates the cells in the alveolus for a long period of time, thereby adversely affecting the human health.

Taking the above-mentioned problem into consideration, as inorganic fiber exerting low chemical resistance to body fluids, inorganic fiber has been proposed which is produced by a method in which a spinning liquid composed of a solution that contains an aluminum chloride hydrate solution (equivalent to basic aluminum chloride), siloxane and colloidal silica, calcium nitrate tetrahydrate and a spinning auxiliary is spun by a sol-gel method, followed by a heat treatment (see Patent Document 1 (JP-A-2009-515800)).

RELATED ART DOCUMENT

Patent Document

Patent Document 1: JP-A-2009-515800

SUMMARY OF THE INVENTION

However, as a result of intensive studies made by the inventors of the invention, it has been revealed that, if the $Al_2O_3$—$SiO_2$—CaO-based inorganic fiber disclosed in Patent Document 1 is produced by a conventional sol-gel method, and the fiber is then fired at a high temperature of about 1000° C., fine pores may be formed in the inorganic fiber. Inorganic fiber having such fine pores is brittle and is hard to exhibit stable quality, and hence, there is a concern that such inorganic fiber may pose a problem when in use. However, a method in which inorganic fiber is produced while favorably controlling the presence or absence of fine pores formed on the surface thereof has not been known.

Under such circumstances, a first object of the invention is to provide a method for producing inorganic fiber having stable quality easily, even if the fiber is $Al_2O_3$—$SiO_2$—CaO-based inorganic fiber. A second object of the invention is to provide $Al_2O_3$—$SiO_2$—CaO-based inorganic fiber having stable quality. A third object of the invention is to provide a method for producing inorganic fibers easily while favorably controlling the presence or absence of fine pores on the surface thereof.

The inventors of the invention made intensive studies in order to solve the above-mentioned technical problem. As a result, the inventors have found that, surprisingly, when $Al_2O_3$—$SiO_2$—CaO-based inorganic fiber is produced by a sol-gel method, inorganic fiber can be produced easily while favorably controlling the presence or absence of fine pores formed on the surface thereof by increasing or decreasing the amount of a spinning auxiliary that has conventionally been added only in a small amount. Further, the inventors of the invention have found that inorganic fiber having stable quality can be produced by adding 3 parts by mass or more of a spinning auxiliary relative to 100 parts by mass of the total amount of an aluminum source, a calcium source and a silicon source. The invention has been made based on this finding.

That is, the invention provides the following:

(1) A method for producing inorganic fiber comprising:
preparing a spinning raw material liquid which comprises an aluminum source, a calcium source, a silicon source and a spinning auxiliary, in which the content of the spinning auxiliary is, in terms of solid matter, 3 parts by mass or more relative to 100 parts by mass of the total of the aluminum source, the calcium source and the silicon source;
spinning the spinning raw material liquid by a sol-gel method to obtain crude inorganic fiber; and
firing the crude inorganic fiber to produce inorganic fiber that comprises 35 mass % to 88 mass % of $Al_2O_3$, 3 mass % to 45 mass % of CaO and 5 mass % to 40 mass % of $SiO_2$ in which the total of $Al_2O_3$, CaO and $SiO_2$ is 97 mass % or more of the entire fiber.

(2) The method for producing inorganic fiber according to (1), wherein the inorganic fiber obtained does not have fine pores.

(3) A method for producing inorganic fiber comprising:
preparing a spinning raw material liquid which comprises an aluminum source, a calcium source, a silicon source and a spinning auxiliary;
spinning the spinning raw material liquid by a sol-gel method to obtain crude inorganic fiber; and
firing the crude inorganic fiber to produce inorganic fiber that comprises 35 mass % to 88 mass % of $Al_2O_3$, 3 mass % to 45 mass % of CaO and 5 mass % to 40 mass % of $SiO_2$ in which the total of $Al_2O_3$, CaO and $SiO_2$ is 97 mass % or more of the entire fiber;
wherein the presence or absence of fine pores in the inorganic fiber obtained is controlled by increasing or decreasing the content of the spinning auxiliary relative to the total content of the aluminum source, the calcium source and the silicon source constituting the spinning raw material liquid.

(4) The method for producing the inorganic fiber according to any of claims (1) to (3), wherein the aluminum source is a water-soluble aluminum compound, the calcium source is a water-soluble calcium compound, the silicon source is a water-soluble or water-dispersible silicon compound, and the spinning raw material liquid is an aqueous solution of spinning raw materials.

(5) The method for producing inorganic fiber according to any of (1) to (4), wherein the aluminum source is basic aluminum chloride.

(6) Inorganic fiber produced by preparing a spinning raw material liquid which comprises an aluminum source, a calcium source, a silicon source and a spinning auxiliary; spinning the spinning raw material liquid by a sol-gel method to obtain crude inorganic fiber; and
firing the crude inorganic fiber;
wherein the inorganic fiber comprises 35 mass % to 88 mass % of $Al_2O_3$, 3 mass % to 45 mass % of CaO and 5 mass % to 40 mass % of $SiO_2$ in which the total of $Al_2O_3$, CaO and $SiO_2$ is 97 mass % or more of the entire fiber, and the inorganic fiber does not have fine pores.

According to the invention, it is possible to provide a method that enables $Al_2O_3$—$SiO_2$—CaO-based inorganic fiber having stable quality to be produced easily. Further, it is possible to provide $Al_2O_3$—$SiO_2$—CaO-based inorganic fiber having stable quality.

DETAILED DESCRIPTION OF THE PREFERRED EMBODIMENTS

Figure 1:
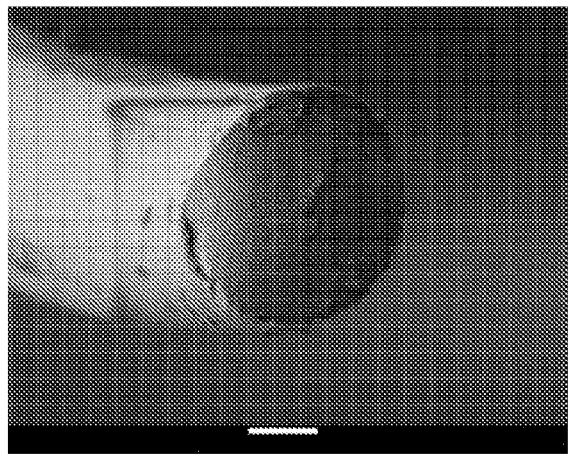
FIG. 1 is a view showing an electron microphotograph (×15,000, the white line indicates 1 μm) of the inorganic fiber obtained in the example of the invention.

The method for producing the inorganic fiber of the invention will be explained.

The method for producing inorganic fiber of the invention comprises preparing a spinning raw material liquid comprising an aluminum source, a calcium source, a silicon source and a spinning auxiliary; spinning the spinning raw material liquid by a sol-gel method to obtain crude inorganic fiber; and firing the thus obtained crude inorganic fiber to produce inorganic fiber that comprises 35 mass % to 88 mass % of $Al_2O_3$, 3 mass % to 45 mass % of CaO and 5 mass % to 40 mass % of $SiO_2$, in which the total of $Al_2O_3$, CaO and $SiO_2$ is 97 mass % or more of the entire fiber. This method is characterized in that the presence or absence of fine pores in the resulting inorganic fiber is controlled by increasing or decreasing the content of the spinning auxiliary relative to the total content of the aluminum source, the calcium source and the silicon source constituting the spinning raw material liquid.

The method for producing inorganic fiber of the invention comprises preparing a spinning raw material liquid comprising an aluminum source, a calcium source, a silicon source and a spinning auxiliary in which, in terms of solid matter, the spinning auxiliary is contained in an amount of 3 parts by mass or more relative to the total content (100 parts by mass) of the aluminum source, the calcium source and the silicon source; spinning the spinning raw material liquid by a sol-gel method to obtain crude inorganic fiber; and firing the obtained crude inorganic fiber to form inorganic fiber that comprises 35 to 88 mass % of $Al_2O_3$, 3 mass % to 45 mass % of CaO and 5 mass % to 40 mass % of $SiO_2$, in which the total of $Al_2O_3$, CaO and $SiO_2$ is 97 mass % or more of the entire fiber.

In the production method of the invention, as the aluminum source, a water-soluble aluminum compound is preferable. A water-soluble aluminum compound is not particularly restricted as long as it shows water solubility or water dispersibility and can be dissolved or dispersed in a desired amount in an aqueous solution of spinning raw materials mentioned later. Specific examples include basic aluminum chloride, aluminum nitrate, basic aluminum carboxylate or the like. Among these water-soluble aluminum compounds, basic aluminum chloride that is commercially versatile and easily available is preferable.

In the production method of the invention, as the calcium source, a water-soluble calcium compound is preferable. A water-soluble calcium compound is not particularly restricted as long as it shows water solubility and can be dissolved in a desired amount in an aqueous solution of spinning raw materials mentioned later. For example, carbonate, nitrate, sulfate, acetate, hydroxide, chloride, fluoride, borate, phosphate or the like of calcium can be given. Among these water-soluble calcium compounds, calcium nitrate and calcium chloride are preferable in respect of stability of an aqueous solution of spinning raw materials.

In the production method of the invention, as the silicon source, a water-soluble or water-dispersible silicon compound can be given.

A water-soluble or dispersible silicon compound is not particularly restricted as long as it shows water solubility and can be dissolved in a desired amount in an aqueous solution of spinning raw materials mentioned later. For example, as the water-soluble silicon compound, a water-soluble silicate, a water-soluble silicon alkoxide (tetramethoxysilane, tetraethoxysilane, tetrapropoxysilane, or the like), siloxane or the like can be given. As the water-dispersible silicon compound, silica sol (colloidal silica) or the like can be given. Of these silicon compounds, silica sol (colloidal silica) is preferable in respect of viscosity stability or the like of an aqueous solution of spinning raw materials. As the colloidal silica, cationic colloidal silica or anionic colloidal silica can be given.

As the silica sol, one obtained by dispersing silica having a particle diameter of 4 to 100 nm in a medium having a solid matter concentration of 5 to 30 mass % is preferable. Silica sol can be produced by a sol-gel method in which silica sol is produced from alkoxysilane or by a silicate soda method in which silica sol is produced from sodium silicate.

In the production method of the invention, the amount of the aluminum source, the calcium source and the silicon source may respectively be the amount corresponding to the content of $Al_2O_3$, CaO and $SiO_2$ constituting intended inorganic fiber.

In the production method of the invention, no specific restrictions are imposed on the spinning auxiliary as long as it can produce desired inorganic fiber. However, in respect of easiness in handling or solubility, the spinning auxiliary is preferably a water-soluble organic polymer. As the water-soluble organic polymer, one or more selected from polyethylene oxide, polypropylene oxide, polyvinyl alcohol, partially saponified polyvinyl alcohol, polyvinyl ether, polyvinyl ester, polyacrylic ester, starch and a copolymer thereof can be given. Among these spinning auxiliaries, polyethylene oxide or partially saponified polyvinyl alcohol are preferable.

In the production method of the invention, the amount of the spinning auxiliary to be mixed in the spinning raw material liquid may be appropriately increased or decreased depending on the presence or absence of the fine pores of the intended inorganic fiber. The degree of decreasing or increasing the amount of the spinning auxiliary may be determined according to the type of the metal element sources constituting the spinning raw material liquid, combination of metal element sources, amount of metal sources or the like.

For example, in the production method of the invention, if the intended inorganic fiber is fiber that does not have fine pores, the amount of the spinning auxiliary may be controlled such that the amount thereof becomes 3 parts by mass or more relative to the total content (100 parts by mass) of the aluminum source, the calcium source and the silicon source. If the intended inorganic fiber is one that has fine pores, the amount of the spinning auxiliary may be controlled such that the amount thereof becomes less than 3 parts by mass relative to the total content (100 parts by mass) of the aluminum source, the calcium source and the silicon source.

If the intended inorganic fiber is fiber that does not have fine pores, a spinning raw material liquid that contains 3 parts by mass or more, preferably 4 parts by mass or more, more preferably 8 parts by mass or more and further preferably 10 parts by mass or more of the spinning auxiliary relative to 100 parts by mass of the total content of the aluminum source, the calcium source and the silicon source is prepared. Although no specific restrictions are imposed on the upper limit of the amount of a spinning auxiliary as long as it is an amount capable of producing the inorganic fiber, normally the upper limit thereof is 40 parts by mass or less (or 35 parts by mass or less or 30 parts by mass or less) relative to 100 parts by mass of the total content of the aluminum source, the calcium source and the silicon source.

The spinning auxiliary is added with an aim of controlling the viscosity or the like of the spinning raw material liquid at the time of spinning, enabling stable spinning to be conducted while suppressing variations in fiber diameter. An excessive amount of the spinning auxiliary is generally thought to be disadvantageous, since the fiber strength may be lowered or the cost may be increased. Accordingly, a smaller amount of the spinning auxiliary to be added to the spinning raw material liquid was believed to be preferable. That is, in general, it was believed that the amount of the spinning auxiliary to be added is preferably about 2 mass % or less relative to the total amount of the solid matters contained in the spinning raw material liquid.

On the other hand, the inventors of the invention made intensive studies, and as a result, they have found that, surprisingly, the presence or absence of fine pores in the resulting inorganic fiber can be controlled by increasing or decreasing the amount of the spinning auxiliary in the spinning raw material liquid relative to the amount of the metal element sources. The invention has been made based on this finding.

In the production method of the invention, it is thought that, when a large amount of the spinning auxiliary is used on purpose relative to the total content of metal element sources, the spinning liquid becomes homogenous due to the suppression of aggregation of the metal element sources, and hence inorganic fiber having no fine pore on the surface can be obtained. On the other hand, when a small amount of the spinning auxiliary is used on purpose relative to the total content of metal element sources, aggregation of the metal element sources is promoted and the spinning liquid becomes un-uniform, whereby porous inorganic fiber having fine pores on the surface and having a large specific area can be obtained. It is believed that such action is affected by the property of forming a protective colloid of a polymer (spinning auxiliary) and metal element sources.

The fiber having no fine pores on the surface can be preferably used in a heat-insulating material, a refractory material or the like that requires a strength. Porous inorganic fiber having fine pores on the surface can be preferably used in a filter material or the like that requires a large specific surface area.

In the production method of the invention, the aluminum source, the calcium source, the silicon source and the spinning auxiliary are dispersed or dissolved in a liquid medium to prepare a spinning raw material liquid.

Although the liquid medium is not particularly restricted as long as it can disperse or dissolve the aluminum source, the calcium source, the silicon source and the spinning auxiliary, an aqueous medium is preferable. By using an aqueous medium as the liquid medium, it is possible to prepare an aqueous solution of spinning raw materials that is suitable for spinning by a sol-gel method can be prepared.

Water is preferable as an aqueous medium. In order to improve the stability of a solution or to improve the stability of spinning, an aqueous medium may be one that is composed mainly of water and contains other mediums that are soluble in water, e.g. alcohols, ketones, amines, amides, carboxylic acids or the like. An aqueous medium may be one that is obtained by adding an organic salt such as ammonium chloride to these mediums.

The method for preparing a spinning raw material liquid is not particularly restricted. It may be prepared by a method in which the aluminum source, the calcium source, the silicon source and the spinning auxiliary are weighed such that they are contained at a desired ratio, and then, they are mixed in a liquid medium such that a predetermined solid matter concentration can be achieved. Alternatively, a spinning raw material liquid may be prepared by a method in which any one or a plurality of the aluminum source, the calcium source, the silicon source and the spinning auxiliary is blended in a liquid medium in a predetermined amount to prepare a preliminary liquid, followed by mixing of other components in a desired amount.

The solid matter concentration of the spinning raw material liquid is preferably 3 to 80 mass %, more preferably 5 to 70 mass %.

If the solid matter concentration of the spinning raw material liquid is in the above-mentioned range, a drying treatment after the spinning can preferably be conducted, whereby fiber having a stable fiber diameter can be obtained easily.

The production method of the invention is a method in which spinning is conducted by a sol-gel method. Specifically, a sol-like spinning raw material liquid is spun to obtain a gel-like inorganic precursor fiber (crude inorganic fiber), followed by firing. In the production method of the invention, at the time of preparing a spinning raw material liquid, by allowing the aluminum source, the calcium source and the silicon source to be mixed by contacting in a liquid medium, a chemical reaction such as a condensation reaction (sol-gel reaction) occurs, thereby to form a sol-like spinning raw material liquid. Alternatively, a sol-like raw material (silica sol, or the like) is used as the aluminum source, the calcium source or the silicon source to obtain a sol-like spinning raw material liquid, followed by spinning and drying, whereby a gel-like inorganic precursor fiber (crude inorganic fiber) can be formed.

As the method for spinning a spinning raw material liquid, various conventional methods can be given. A dry continuous spinning method in which a spinning raw material liquid having a desired composition is discharged from a nozzle, and then dried while winding and elongating by means of a winder; a rotating centrifugal hollow disc method in which a spinning raw material liquid having a desired composition is supplied to a disc having holes, and the disc is rotated to allow the liquid to be discharged from the holes by centrifugal force, and thereafter, the elongated spinning raw material liquid is dried; and an air blow method in which a spinning raw material liquid having a desired composition is dried while elongating by an air stream, whereby discontinuous fibers are obtained.

In the above-mentioned various spinning methods, it is preferable to adjust the viscosity of the spinning raw material liquid appropriately. The viscosity of the spinning raw material liquid can be controlled by changing the amount of the spinning auxiliary to be added or by concentration by heating or reducing in pressure or by dilution by addition of water.

In the production method of the invention, the viscosity of the spinning raw material liquid is preferably about 0.1 to 300 Pa·s, more preferably about 0.5 to 250 Pa·s.

In the present invention, the viscosity of the spinning raw material liquid means a shearing viscosity at a shearing speed of $1s^{-1}$ that is measured by means of a viscosity measuring apparatus (Pysica MCR301 manufactured by Anton Paar GmbH) in the state where the liquid temperature of the spinning liquid is kept at 25° C.

For example, when the spinning raw material liquid is spun by the dry continuous spinning method, the viscosity is preferably about several tens Pa·s to about several hundreds Pa·s, more preferably 60 Pa·s to 200 Pa·s. If the above-mentioned viscosity is less than several tens Pa·s, the spinning liquid discharged from the nozzle tends to suffer from capillary break-up due to a high surface tension, thereby making spinning difficult. On the other hand, if the viscosity exceeds several hundreds Pa·s, cohesion failure occurs at the time of elongating fiber and, as a result, the fiber diameter is hard to be reduced. In addition, a high pressure is required when a spinning liquid is extruded from a nozzle, leading to an increase in size of a fiber-making apparatus.

If spinning is conducted by a rotating centrifugal hollow disc method in which a spinning raw material liquid is ejected through a plurality of holes by centrifugal force, followed by elongating or by an air blow method in which a spinning liquid is elongated by blowing air, for example, the viscosity of a spinning raw material liquid is preferably about 1 Pa·s to 50 Pa·s. If the viscosity is less than 1 Pa·s, a spinning raw material liquid is scattered in the form of liquid droplets without becoming a fiber, or, if it becomes a fiber, when a spinning liquid is elongated and broken, a large amount of spherical particles (shots) are generated. On the other hand, if the viscosity exceeds 50 Pa·s, elongation by centrifugal force or blowing becomes difficult, whereby it becomes difficult to form fibers.

In the production method of the invention, it is preferable to subject a liquid thread obtained by the above-mentioned spinning treatment to a drying treatment. It is preferred that drying of a liquid thread be conducted by supplying hot air or the like of 50 to 400° C., preferably 70 to 350° C., to a liquid thread in the floating state.

If the drying temperature in the state of liquid threads is less than 50° C., the average diameter of the fiber is decreased due to excessive elongation of a liquid thread raw material liquid, formation of shots by the surface tension of a spinning raw material liquid or adhesion of crude inorganic fibers may occur. If the drying temperature of liquid threads exceeds 400° C., the threads are dried and solidified before a liquid thread raw material liquid is thoroughly elongated, whereby the average fiber diameter may be significantly increased.

Drying of the liquid thread can be conducted during a period of time for which the thread is transported to a cotton gathering room by a hot air, for example. By collecting liquid threads that have been dried by sucking from the lower part of a cotton gathering room, they can be sent to a next step as crude inorganic fiber.

In the production method of the invention, subsequently, the resulting crude inorganic fiber is fired. The firing temperature is preferably 800° C. or more and less than the liquid phase formation temperature, more preferably 900° C. or more and less than the liquid phase formation temperature, and further more preferably 1000° C. or more and less than the liquid phase formation temperature.

Specifically, the firing temperature is preferably 800° C. or more and 1500° C. or less, and is a temperature which does not form a liquid phase, more preferably 800° C. or more and 1350° C. or less, and is a temperature which does not form a liquid phase, further preferably 900° C. or more and 1350° C. or less, and is a temperature which does not form a liquid phase, and further more preferably 1000° C. or more and 1350° C. or less, and is a temperature which does not form a liquid phase.

If the firing temperature is less than 800° C., organic components such as organic polymers that are used as a spinning auxiliary remains in inorganic fiber. If the firing temperature exceeds 1500° C., the resulting inorganic fiber becomes very brittle due to the growth of crystal grains, or the fiber forms a liquid phase and the liquid phase reacts with a hearth.

The firing time is not particularly restricted as long as the desired inorganic fiber can be obtained, and may be appropriately set.

In the production method of the invention, firing can be conducted by known electric furnace such as continuous furnaces including a roller-hearth furnace and a walking beam furnace.

The atmosphere at the time of firing is preferably an air or an acidic atmosphere in order to decompose organic substances used as the spinning auxiliary. When decomposition performance of a remaining organic substance is not required to be taken into consideration, firing may be conducted in an inert gas atmosphere such as nitrogen.

In the production method of the invention, by subjecting the crude inorganic fiber to the above-mentioned firing treatment, inorganic fiber that contains 35 mass % to 88 mass % of $Al_2O_3$, 3 mass % to 45 mass % of CaO and 5 mass % to 40 mass % of $SiO_2$ and the total content of $Al_2O_3$, CaO and $SiO_2$ is 97 mass % or more of the entire fiber is produced.

The inorganic fiber obtained by the production method of the invention comprises 35 mass % to 88 mass % of $Al_2O_3$. By containing $Al_2O_3$ in the above-mentioned amount range, a desirable heat resistance is imparted to the inorganic fiber. The content of $Al_2O_3$ is preferably 40 mass % to 80 mass %, more preferably 50 mass % to 70 mass %.

The inorganic fiber obtained by the method of the invention comprise 3 mass % to 45 mass % of CaO. By containing CaO in the above-mentioned range, it is possible to impart solubility in physiological saline to the resulting inorganic fiber. The content of CaO is preferably 5 mass % to 30 mass %, and more preferably 15 mass % to 25 mass %. If the amount of CaO is increased, fine pores may not be formed easily.

The inorganic fiber obtained by the production method of the invention comprises 5 mass % to 40 mass % of $SiO_2$. By containing $SiO_2$ in the above-mentioned range, it is possible to impart desired heat resistance to the resulting inorganic fiber. The content of $SiO_2$ is preferably 8 mass % to 35 mass %, more preferably 10 mass % to 30 mass %.

In the inorganic fiber obtained by the production method of the invention, the total content of $Al_2O_3$, CaO and $SiO_2$ is 97 mass % or more, more preferably 98 mass % or more of the entire inorganic fiber.

The inorganic fiber obtained by the production method of the invention can contain inevitable components in an amount of less than 3 mass %. Here, the "inevitable components" means impurities that are mixed in when preparing inorganic fiber.

In the inorganic fiber obtained by the production method of the invention, due to the presence of $Al_2O_3$, CaO and $SiO_2$ in an amount of 97 mass % or more of the entire fiber, desired heat resistance and solubility in physiological saline can be imparted to the resulting inorganic fiber.

In the production method of the invention, the proportion (mass %) of each of components constituting the resulting inorganic fiber means a value obtained by using powder obtained by a method in which part of a spinning raw material liquid used at the time of preparing fibers is taken out and dried, followed by firing at 1000° C. for 2 hours as a measurement specimen, and conducting a measurement by means of a fluorescent X-ray spectrometer (RIX2000 manufactured by Rigaku Corporation).

The resulting inorganic fiber may contain balancing components. In such a case, a compensation calculation is conducted such that the total value of metal oxides excluding balancing components will be 100 mass %.

In the production method of the invention, it is preferred that the resulting inorganic fiber have an average fiber diameter of 1 μm to 15 μm, more preferably 2 μm to 10 μm.

In the specification of the invention, the average fiber diameter of the inorganic fiber means an average value obtained by a method in which 100 to 400 fibers are arbitrarily selected from the fibers in a photograph (magnification ×500 to 2000) taken by a scanning electron microscope (JSM-5800LV, manufactured by JEOL Ltd.), the widths of these fibers are measured, and the average of the widths thus measured is calculated.

In the production method of the invention, since a spinning raw material liquid containing a large amount of a spinning auxiliary is used, by forming crude inorganic fibers by spinning by a sol-gel method, followed by firing the resulting crude inorganic fiber, whereby inorganic fiber having no fine pores and stable quality can be obtained.

In the specification of the invention, the "does not have fine pores" means that, when observing the vertical fracture surface of the inorganic fiber that is fired at a desired temperature by means of a scanning electron microscope (JSM-7600F, manufacture by JEOL Ltd.), the number of fine pores having a diameter of 40 nm or more observed in the entire vertical fracture surface of the fiber is 10 or less. Additionally in the specification of the invention, the "having fine pores" means that the number of fine pores having a diameter of 40 nm or more is 11 or more as in the above-mentioned case.

In the production method of the invention, pores may be formed in the fracture surface when air bubbles are incorporated at the time of the production. However, the number of these fine pores is not included in the above-mentioned number of fine pores.

No specific restrictions are imposed on the upper limit of the diameter of the fine pores formed in the inorganic fiber, but normally ½ or less of the average fiber diameter.

It is preferred that the inorganic fiber obtained by the production method of the invention be one that has no phase separation. It is thought that fine pores tend to be formed easily in the $Al_2O_3$—$SiO_2$—$CaO$-based inorganic fiber obtained by the production method of the invention due to low sinterability, and is assumed that sinterability is further lowered when the fiber has phase separation. It is thought that, in the production method of the invention, since a spinning raw material liquid containing a large amount of a spinning auxiliary is used, aggregation of the aluminum source, the calcium source and the silicon source in the spinning raw material liquid can be suppressed, whereby a spinning liquid becomes homogeneous, and inorganic fiber that does not have fine pores can be obtained.

In the present specification, the presence or absence of phase separation can be observed by measuring the cross sectional area of the inorganic fiber obtained by the production method of the invention by an energy dispersive X-ray spectrometry (EDS) ("Noran SYSTEM 7, manufactured by Thermo Fisher Scientific K.K.).

It is preferred that the inorganic fiber obtained by the production method of the invention have a ratio of a surface pressure when the Gap opening ratio becomes 12.5% relative to a surface pressure when the fiber is compressed until the packing density becomes 0.30 g/cm$^3$ (surface pressure residual ratio) be 10% or more, more preferably 15% or more.

In the present specification, the surface pressure residual ratio of the inorganic fiber means a value measured by the following method. Specifically, 0.094 g of inorganic fiber is put in a container (diameter: 10.2 mm) that is placed on a compression plate. In this state, the inorganic fiber is gradually compressed from above by means of a compression rod until the packing density of the inorganic fiber becomes 0.30 g/cm$^3$. Taking the Gap (distance) between the compression plate and the compression rod at this time as X (mm), the compression force applied by means of the compression bar is gradually decreased until the distance between the compression plate and the compression bar becomes X+0.125X (mm) (i.e. the opening ratio of the Gap between the compression plate and the compression rod becomes 12.5%), and calculation is conducted by the following formula based on the surface pressure (Pa) at distance X and the surface pressure (Pa) at distance X+0.125X:

Surface pressure residual ratio (%)={(surface pressure (Pa) at distance $X$+

0.125$X$)/(surface pressure (Pa) at distance $X$)×100

It is preferred that the inorganic fiber obtained by the production method of the invention have a heat resistance temperature (melting point) of 1000° C. or more, more preferably 1300° C. or more, and further more preferably 1350° C. or more. Since the inorganic fiber obtained by the production method of the invention has a high heat resistance, i.e. having a melting point of 1000° C. or more, it can be preferably used as constituting materials such as insulating materials, refractory materials or the like used in various fields such as automobile fields, construction fields, industrial furnace fields or the like.

Since the production method of the invention uses a spinning raw material liquid containing a large amount of a spinning auxiliary, it is possible to produce inorganic fiber having stable quality, e.g. having no fine pores.

According to the invention, a method for producing an $Al_2O_3$—$SiO_2$—$CaO$-based organic fiber having stable quality easily can be provided.

Next, the inorganic fiber of the invention will be explained.

The inorganic fiber of the invention is inorganic fiber that is obtained by a method in which a spinning raw material liquid that contains an aluminum source, a calcium source, a silicon source and a spinning auxiliary is prepared, the spinning raw material liquid is spun by a sol-gel method to obtain crude inorganic fiber, and the crude organic fiber is fired, and is characterized in that it comprises 35 mass % to 88 mass % of $Al_2O_3$, 3 mass % to 45 mass % of CaO and 5 mass % to 40 mass % of $SiO_2$ and the total content of $Al_2O_3$, CaO and $SiO_2$ is 97 mass % or more of the entire fiber and does not have fine pores.

In the inorganic fiber of the invention, the details of the aluminum source, the calcium source, the silicon source, the spinning auxiliary and the spinning raw material liquid, and the details of the spinning method and the crude inorganic fiber are as mentioned above referring to the production method of the invention.

The details of the composition and the physical properties of the inorganic fiber of the invention are also as mentioned above referring to the production method of the invention.

The inorganic fiber of the invention can be preferably used as constituting materials such as an insulating material, a refractory material or the like used in various fields such as automobile fields, construction fields, industrial furnace fields, or the like.

According to the invention, it is possible to provide $Al_2O_3$—$SiO_2$—$CaO$-based inorganic fiber having stable quality, e.g. having no fine pores.

EXAMPLES

The invention will be explained in more detail with reference to the following Examples and Comparative Examples, which should not be construed as limiting the scope of the invention.

Example 1

As the aluminum source, basic aluminum chloride (Takibain manufactured by Taki Chemical Co., Ltd.) was used, as the calcium source, calcium nitrate (manufactured by Wako Pure Chemical Co., Ltd.) was used, as the silicon source, anionic colloidal silica (Snowtex O manufactured by Nissan Chemical Industries, Ltd.) was used, as the spinning auxiliary, partially saponified polyvinyl alcohol (PVA 217, manufactured by Kuraray Co., Ltd.) was used, and as the liquid medium, water was used, whereby an aqueous solution of spinning raw materials was prepared.

That is, corresponding amounts of basic aluminum chloride, calcium nitrate and anionic colloidal silica were added and mixed in water such that the resulting inorganic fiber contained 60 mass % of $Al_2O_3$, 10 mass % of CaO, and 30 mass % of $SiO_2$. In addition, in terms of solid matter, relative to 100 parts by mass of the total content of basic aluminum chloride, calcium nitrate and anionic colloidal silica, 10 parts by mass of a spinning auxiliary and 0.1 part by mass of an anti-foaming agent (SN defoamer manufactured by San Nopco Ltd.) were mixed and stirred for 5 minutes. The resultant was concentrated while reducing the pressure at 40° C., whereby an aqueous solution of spinning raw materials having a solid matter concentration of 56.4 mass % and a viscosity at 25° C. of 3.6 Pa·s was prepared.

Spinning (making the aqueous solution of spinning raw materials into a fiber) was conducted by a blowing method in which an aqueous solution of spinning raw materials was supplied to a high-speed spinning air stream, and as a result, crude inorganic fiber having a length of several tens to several hundreds mm was obtained. The spinning was conducted by a method in which the aqueous solution of spinning raw materials was discharged from a spinning nozzle having a diameter of 0.5 mm such that the aqueous solution of spinning raw materials was discharged in an amount of 12 ml/h per nozzle at a gas flow rate of 30 to 35 m/s in a manner that the solution was discharged in parallel with the air nozzle. Thereafter, a drying treatment was conducted by allowing it to pass through a drying zone, and cotton was collected by means of a mesh, whereby crude inorganic fiber was obtained.

Subsequently, by firing the crude inorganic fiber obtained above at 1000° C. for 10 minutes, inorganic fiber having an average diameter of 4.0 μm and containing 60 mass % of $Al_2O_3$, 10 mass % of CaO and 30 mass % of $SiO_2$ was obtained.

The inorganic fiber obtained above did not have fine pores. The results obtained in this Example are shown in Table 1.

Example 2 to Example 4

Inorganic fibers were prepared in the same manner as in Example 1, except that spinning raw material liquids were prepared by changing the content (in terms of solid matter) of the spinning auxiliary to be mixed to 15 parts by mass (Example 2), 20 parts by mass (Example 3) and 30 parts by mass (Example 4) relative to the total content (100 parts by mass) of the basic aluminum chloride, calcium nitrate and anionic colloidal silica mentioned above, whereby inorganic fibers containing 60 mass % of $Al_2O_3$, 10 mass % of CaO and 30 mass % of $SiO_2$ and having an average fiber diameter of 3.5 to 4.5 μm were respectively prepared.

In the same manner as in Example 1, the presence or absence of fine pores in the inorganic fiber obtained was confirmed. The results are shown in Table 1.

Comparative Example 1 and Comparative Example 2

Inorganic fibers were prepared in the same manner as in Example 1, except that spinning raw material liquids were prepared by changing the content (in terms of solid matter) of the spinning auxiliary to be mixed to 0.5 parts by mass (Comparative Example 1) and 2 parts by mass (Comparative Example 2) relative to the total content (100 parts by mass) of the basic aluminum chloride, calcium nitrate and anionic colloidal silica mentioned above, whereby inorganic fibers containing 60 mass % of $Al_2O_3$, 10 mass % of CaO and 30 mass % of $SiO_2$ and having an average fiber diameter of 3.5 to 4.5 μm were respectively prepared.

In the same manner as in Example 1, the presence or absence of fine pores on the inorganic fiber obtained was confirmed. The results are shown in Table 1.

TABLE 1

|  |  |  | Com. Ex. 1 | Com. Ex. 2 | Ex. 1 | Ex. 2 | Ex. 3 | Ex. 4 |
|---|---|---|---|---|---|---|---|---|
| Spinning raw material solution | Components | Aluminum source | Basic aluminum chloride | | | | | |
| | | Silicon source | Anionic colloidal silica | | | | | |
| | | Calcium source | Calcium nitrate | | | | | |
| | | Spinning auxiliary | Partially saponified polyvinyl alcohol | | | | | |
| | Amount of spinning auxiliary (parts by mass) | | 0.5 | 2 | 10 | 15 | 20 | 30 |
| | Viscosity of spinning raw material solution (Pa·s) | | 5.1 | 5.5 | 3.6 | 2.7 | 0.9 | 3.4 |
| Inorganic fiber | Content | $Al_2O_3$ Mass % | 60 | | | | | |
| | | $SiO_2$ | 30 | | | | | |
| | | CaO | 10 | | | | | |
| | Presence or absence of fine pores | | Present | Present | Absent | Absent | Absent | Absent |

Example 5 and Example 6

Inorganic fibers were prepared in the same manner as in Example 1, except that spinning raw material liquids were prepared by using basic aluminum chloride (Takibain manufactured by Taki Chemical Co., Ltd.) as the aluminum source, calcium nitrate (manufactured by Wako Pure Chemical Co., Ltd.) as the calcium source, cationic colloidal silica (Snowtex AK manufactured by Nissan Chemical Industries, Ltd.) as the silicon source, polyethylene oxide (PEO-8Z, manufactured by Sumitomo Seika Chemicals Co., Inc.) as the spinning auxiliary, and water as the liquid medium, and the content of the spinning auxiliary to be mixed was changed to 10 parts by mass (Example 5) and 30 parts by mass (Example 6) relative to the total content (100 parts by mass) of the basic aluminum chloride, calcium nitrate and cationic colloidal silica mentioned above, whereby inorganic fibers containing 60 mass % of $Al_2O_3$, 10 mass % of CaO and 30 mass % of $SiO_2$ were respectively prepared. The average fiber diameter of the obtained inorganic fiber was 4.0 to 5.5 μm.

In the same manner as in Example 1, the presence or absence of fine pores in the inorganic fiber obtained was confirmed. The results are shown in Table 2.

Comparative Example 3

Inorganic fiber was prepared in the same manner as in Example 1, except that a spinning raw material liquid was prepared by using basic aluminum chloride (Takibain manufactured by Taki Chemical Co., Ltd.) as the aluminum source, calcium nitrate (manufactured by Wako Pure Chemical Co., Ltd.) was used as the calcium source, cationic colloidal silica (Snowtex AK manufactured by Nissan Chemical Industries, Ltd.) as the silicon source, polyethylene oxide (PEO-8Z, manufactured by Sumitomo Seika Chemicals Co., Inc.) as the spinning auxiliary, and water as the liquid medium, and the content of the spinning auxiliary to be mixed was changed to 2 parts by mass relative to the total content (100 parts by mass) of the basic aluminum chloride, calcium nitrate and cationic colloidal silica mentioned above, whereby inorganic fiber containing 60 mass % of $Al_2O_3$, 10 mass % of CaO and 30 mass % of $SiO_2$ was prepared. The average fiber diameter of the obtained inorganic fiber was 4.8 μm.

In the same manner as in Example 1, the presence or absence of fine pores in the inorganic fiber obtained was confirmed. The results are shown in Table 2.

Comparative Example 4

Inorganic fiber was prepared in the same manner as in Example 1, except that a spinning raw material liquid was prepared by using basic aluminum chloride (Takibain manufactured by Taki Chemical Co., Ltd.) as the aluminum source, calcium nitrate (manufactured by Wako Pure Chemical Co., Ltd.) as the calcium source, cationic colloidal silica (Snowtex AK manufactured by Nissan Chemical Industries, Ltd.) and siloxane (KF354L manufactured by Shin-etsu Chemical Co., Ltd.) (solid matter weight of cationic colloidal silica: solid matter weight of siloxane=20:80) as the silicon source, polyethylene oxide (PEO-1, manufactured by Sumitomo Seika Chemicals Co., Inc.) as the spinning auxiliary, and water as the liquid medium, and the content of the spinning auxiliary to be mixed was changed to 1 parts by mass relative to the total content (100 parts by mass) of the basic aluminum chloride, calcium nitrate, cationic colloidal silica and siloxane mentioned above, whereby inorganic fiber containing 63 mass % of $Al_2O_3$, 11 mass % of CaO and 26 mass % of $SiO_2$ was prepared.

The content of each component constituting the inorganic fiber obtained in this Comparative Example was obtained by measuring the inorganic fiber after firing at 1000° C. by means of an energy dispersive X-ray spectrometry (EDS) ("Noran SYSTEM 7, manufactured by Thermo Fisher Scientific K.K.) at an accelerating voltage of 10 kv. The average fiber diameter of the resulting inorganic fiber was 4.0 μm.

The presence or absence of the fine pores in the resulting inorganic fiber was confirmed in the same manner as in Example 1. The results are shown in Table 2.

Figure 2:
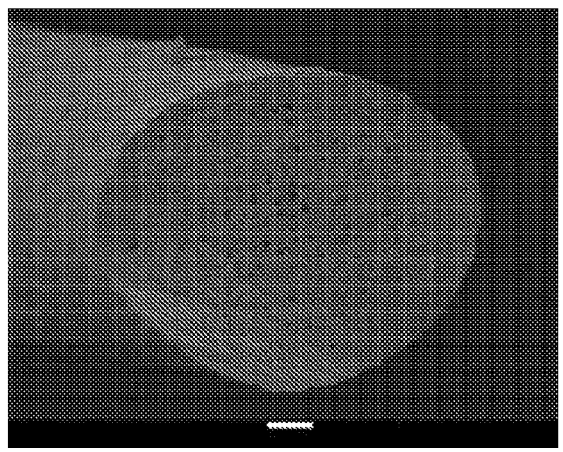
FIG. 2 is a view showing an electron microphotograph (×10,000, the white line indicates 1 μm) of the inorganic fiber obtained in the comparative example of the invention.

An electron microphotograph showing the fracture surface of the inorganic fiber obtained in Example 1 is shown in FIG. 1, and an electron microphotograph showing the fracture surface of the inorganic fiber obtained in Comparative Example 3 is shown in FIG. 2.

The surface pressure residual ratios (the ratio of a surface pressure when the opening ratio of the Gap was increased to 12.5% relative to a surface pressure when the fiber was compressed until the packing density was reached to 0.30 g/cm³) of the inorganic fibers obtained in Example 1, Comparative Example 3 and Comparative Example 4 were measured, and found to be 18.2% (Example 1) and 4.6% (Comparative Example 3) and 9.7% (Comparative Example 4), respectively.

Figure 3:
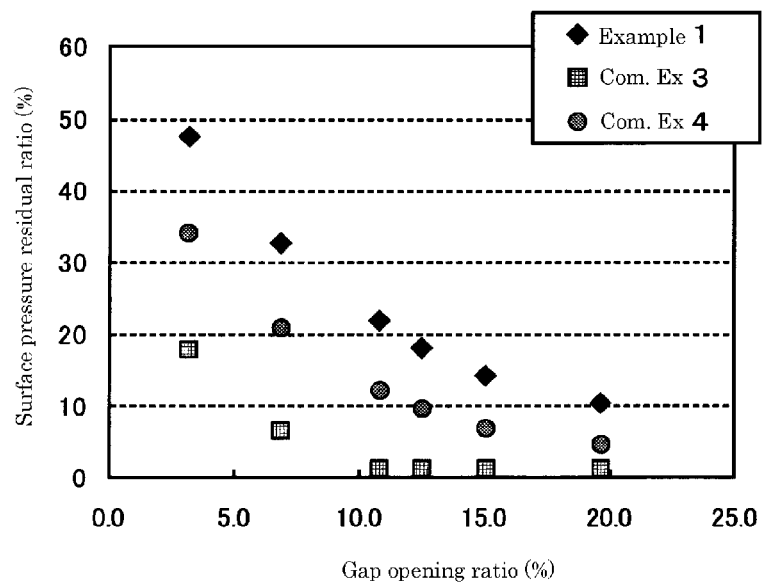
FIG. 3 is a view showing the surface pressure residual ratio (%) at each Gap opening ratio of the inorganic fiber obtained in the Example and the Comparative Example of the invention.

In the inorganic fibers obtained in Example 1, Comparative Example 3 and Comparative Example 4, the ratio of a surface pressure when the Gap opening ratio was taken as 3.2%, 6.9%, 10.8%, 12.5%, 15.1% and 19.7%, respectively, relative to a surface pressure when the inorganic fiber was compressed until the packing density reached to 0.30 g/cm³ (surface pressure residual ratio at each Gap opening ratio) was plotted and shown in FIG. 3.

The ratio of a surface pressure when the Gap opening ratio was taken as 12.5% relative to a surface pressure when the inorganic fiber was compressed until the packing density reached 0.30 g/cm³ (surface pressure residual ratio (%)) was, as mentioned above, calculated by the following formula when the Gap (distance) between the compression plate and the compression rod used for compressing the inorganic fiber at the time when the packing ratio became 0.30 g/cm³ was taken as X (mm):

Surface pressure residual ratio (%)={(surface pressure (Pa) at distance X+0.125X)/(surface pressure (Pa) at distance X)}×100

The ratio of a surface pressure when the Gap opening ratio was taken as 3.2%, 6.9%, 10.8%, 15.1% and 19.7%, respectively, relative to a surface pressure when the inorganic fiber was compressed until the packing density became 0.30 g/cm³ (the surface pressure residual ratio (%) at each Gap opening ratio)) was obtained by replacing the "surface pressure (Pa) at distance X+0.125X" to the "surface pressure (Pa) at distance X+0.032X", the "surface pressure (Pa) at distance X+0.069X", the "surface pressure (Pa) at distance X+0.108X", the "surface pressure (Pa) at distance X+0.151X", and "surface pressure (Pa) at distance X+0.197X".

TABLE 2

|  |  |  | Com. Ex. 3 | Ex. 5 | Ex. 6 | Com. Ex. 4 |
|---|---|---|---|---|---|---|
| Spinning raw material solution | Components | Aluminum source | Basic aluminum chloride | | | Basic aluminum chloride |
| | | Silicon source | Cationic colloidal silica | | | Cationic colloidal silica + siloxane |
| | | Calcium source | Calcium nitrate | | | Calcium nitrate |
| | | Spinning auxiliary | Polyethylene oxide | | | Polyethylene oxide |
| | | Amount of spinning auxiliary (parts by mass) | 2 | 10 | 30 | 1 |
| | | Viscosity of spinning raw material solution (Pa·s) | 2.7 | 5.0 | 11.1 | 2.3 |
| Inorganic fiber | Contents | $Al_2O_3$ Mass % | | 60 | | 63 |
| | | $SiO_2$ | | 30 | | 26 |
| | | CaO | | 10 | | 11 |
| | Presence or absence of fine pores | | Present | Absent | Absent | Present |

From Tables 1, 2 and FIG. 1, it can be understood that the inorganic fiber obtained in Examples 1 to 6 did not have fine pores, and from Tables 1, 2 and FIG. 2 it can be understood that inorganic fiber obtained in Comparative Examples 1 to Comparative Example 4 had fine pores.

Further, from FIG. 3, it can be understood that, the inorganic fiber obtained in the Examples of the invention had a higher surface pressure residual ratio as compared with the inorganic fiber obtained in Comparative Examples of the invention.

Example 7 to Example 13

Inorganic fibers were prepared in the same manner as in Example 1 except that spinning raw material liquids were prepared by changing the content (in terms of solid matter) of the spinning auxiliary to be mixed to 4 parts by mass and 10 parts by mass, respectively, relative to the total content (100 parts by mass) of the basic aluminum chloride, calcium nitrate and anionic colloidal silica mentioned above, whereby inorganic fibers containing $Al_2O_3$, CaO and $SiO_2$ with a composition ratio shown in Table 3 and having an average fiber diameter of 3.5 to 4.5 μm were respectively prepared.

In the same manner as in Example 1, the presence or absence of fine pores in the inorganic fibers obtained was confirmed. The results are shown in Table 3. In the table, ⊚ indicates absence of fine pores, ○ indicates presence of a slight amount of fine pores, Δ indicates presence of only a small amount of fine pores and X indicates presence of a large amount of fine pores (corresponding to Comparative Example).

TABLE 3

| | | Examples | | | | | | |
|---|---|---|---|---|---|---|---|---|
| | | 7 | 8 | 9 | 10 | 11 | 12 | 13 |
| Composition ratio (wt %) | $Al_2O_3$ | 50 | 60 | 60 | 70 | 70 | 70 | 80 |
| | $SiO_2$ | 35 | 20 | 30 | 8 | 18 | 25 | 10 |
| | CaO | 15 | 20 | 10 | 22 | 12 | 5 | 10 |
| Fine pore observation SEM image | Spinning auxiliary 4 parts by mass | ⊚ | ⊚ | Δ | ⊚ | Δ | Δ | Δ |
| | Spinning auxiliary 10 parts by mass | ⊚ | ⊚ | ⊚ | ⊚ | ⊚ | ○ | ○ |

INDUSTRIAL APPLICABILITY

According to the invention, it is possible to provide a method capable of producing easily $Al_2O_3$—$SiO_2$—CaO-based inorganic fiber having stable quality, and is possible to provide $Al_2O_3$—$SiO_2$—CaO-based inorganic fiber having stable quality. According to the invention, it is possible to provide a method for producing inorganic fiber easily while favorably suppressing the presence or absence of pores formed on the surface thereof.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the Japanese patent applications claiming the priority under the Paris Convention to the invention are incorporated herein by reference in its entirety.

The invention claimed is:

1. A method for producing inorganic fiber, the method comprising the steps of:
preparing a spinning raw material liquid that comprises an aluminum source, a calcium source, a silicon source and a spinning auxiliary, wherein the content of the spinning auxiliary is, in terms of solid matter, 3 parts by mass or more relative to 100 parts by mass of the total of the aluminum source, the calcium source and the silicon source;

spinning the spinning raw material liquid by a sol-gel method to obtain crude inorganic fiber; and firing the crude inorganic fiber to produce inorganic fiber that comprises 35 mass % to 88 mass % of $Al_2O_3$, 3 mass % to 45 mass % of CaO and 5 mass % to 40 mass % of $SiO_2$ in which the total of $Al_2O_3$, CaO and $SiO_2$ is 97 mass % or more of the entire fiber.

2. The method for producing inorganic fiber according to claim 1, wherein the inorganic fiber obtained does not have fine pores.

3. The method for producing the inorganic fiber according to claim 1, wherein the aluminum source is a water-soluble aluminum compound, the calcium source is a water-soluble calcium compound, the silicon source is a water-soluble or water-dispersible silicon compound, and the spinning raw material liquid is an aqueous solution of spinning raw materials.

4. The method for producing inorganic fiber according to claim 1, wherein the aluminum source is basic aluminum chloride.

5. Inorganic fiber produced by preparing a spinning raw material liquid that comprises an aluminum source, a calcium source, a silicon source and a spinning auxiliary;

spinning the spinning raw material liquid by a sol-gel method to obtain crude inorganic fiber; and firing the crude inorganic fiber;

wherein the inorganic fiber comprises 35 mass % to 88 mass % of $Al_2O_3$, 3 mass % to 45 mass % of CaO and 5 mass % to 40 mass % of $SiO_2$ in which the total of $Al_2O_3$, CaO and $SiO_2$ is 97 mass % or more of the entire fiber, and the inorganic fiber does not have fine pores.

* * * * *